US008479148B2

(12) United States Patent
Elaasar

(10) Patent No.: US 8,479,148 B2
(45) Date of Patent: Jul. 2, 2013

(54) COMPUTER METHOD AND APPARATUS FOR MODEL TRANSFORMATION REAPPLY

(75) Inventor: Maged E. Elaasar, Kanata (CA)

(73) Assignee: International Business Machines Corporation, Armonk, NY (US)

( * ) Notice: Subject to any disclaimer, the term of this patent is extended or adjusted under 35 U.S.C. 154(b) by 1209 days.

(21) Appl. No.: 11/950,991

(22) Filed: Dec. 5, 2007

(65) Prior Publication Data
US 2009/0150855 A1 Jun. 11, 2009

(51) Int. Cl.
*G06F 9/44* (2006.01)

(52) U.S. Cl.
USPC ............................................... 717/104

(58) Field of Classification Search
USPC ............................................... 717/104
See application file for complete search history.

(56) References Cited

U.S. PATENT DOCUMENTS

| | | | |
|---|---|---|---|
| 2006/0064667 A1* | 3/2006 | Freitas .................... | 717/104 |
| 2006/0117037 A1* | 6/2006 | Gutz et al. ............... | 707/100 |
| 2006/0294506 A1* | 12/2006 | Dengler et al. ........... | 717/131 |
| 2009/0064090 A1* | 3/2009 | Anonsen et al. .......... | 717/104 |

OTHER PUBLICATIONS

Czarnecki, K., et al., "Feature-Based Survey of Model Transformation Approaches," *IBM Systems Journal*, vol. 45(3): pp. 612-646, (2006).

IBM Rational Software Architect Version 7.0. http://www-1.ibm.com/support/docview.wss?rs=2044&uid=swg24013690, Release Date (Dec. 5, 2006).

Swithinbank, M., et al., "Patterns: Model-Driven Development Using IBM Rational Software Architect (Section 9.5.2)", *IBM Redbooks*. http://www.redbooks.ibm.com/redbooks/pdfs/sg247105.pdf (Dec. 2005).

Popma, R., "JET Tutorial" http://www.eclipse.org/articles/Article-JET/jet-tutorial.html (May 31, 2004).

\* cited by examiner

*Primary Examiner* — Li B Zhen
*Assistant Examiner* — Bradford Wheaton
(74) *Attorney, Agent, or Firm* — Hamilton, Brook, Smith & Reynolds, P.C.

(57) ABSTRACT

Provided is a method and system for model transformation reapply. Through a programming model transformation, a target model is generated. The target model has one or more model elements. As manual changes are made to the target model, parts of the target model are marked as non-changeable by annotations. The annotations are inserted into respective model elements of the target model and indicate which parts are non-changeable and thus preservable. The annotations enable reapplying of the transformation to make changes to the target model but preserve manual changes made to the model elements based on the inserted annotations. The reapply of the transformation may be configured with options to handle the deltas between the existing target model and newly generated target models of the transformation.

15 Claims, 3 Drawing Sheets

COMPUTER METHOD AND APPARATUS FOR MODEL TRANSFORMATION REAPPLY

BACKGROUND OF THE INVENTION

Model to model transformation is an integral process in the model-driven architecture (MDA), an approach to system design adopted by the Object Management Group (OMG). MDA promotes the use of models as development artifacts that can be transformed from the highest abstraction level to the lower abstraction level through a chain of well-defined model to model transformations.

The state of the art and practice contains several proposals for implementing model to model transformation, as discussed in these surveys:

- K. Czarnecki and S. Helsen. Feature-based Survey of Model Transformation Approaches. IBM Systems Journal, vol. 45, number 3, pages 612-646, 2006;
- T. Gardner, C. Griffin, J. Koehler, and R. Hauser. A Review of OMG MOF 2.0 Query/Views/Transformations Submissions and Recommendations toward the Final Standard. OMG Document ad/03-08-02; and
- S. Sendall and W. Kozaczynski. Model Transformation: The Heart and Soul of Model-Driven Software Development. IEEE Software 20, No. 5, 42-45, 2003.

One key feature of comparison is the transformation's 'target incrementality', which is the ability to update existing target models based on changes to source models. Typically a transformation maintains traceability links between the source and target elements and uses them to establish whether target model elements need updating. The transformation then applies the necessary changes to the impacted target model elements and at the same time preserves the ones that can be preserved.

Two kinds of incremental change strategies can be implemented. One kind uses the traceability links between the source and target model element that are defined as part of the transformation itself. For example, in MTF (IBM Model Transformation Framework 1.0.0: Programmer's Guide. 2004. at www.alphaworks.ibm.com/tech/mtf), traceability links are expressed as 'identity conditions' specified as part of every mapping rule. The condition asserts whether elements form the source and target corresponds to each other in the context of this rule. If a source element did not correspond to a target element, one is created new, otherwise a binding is formed and further consistency checking is done between the two elements to determine if changes to the target are needed.

The other kind of incremental change strategy initially ignores the old target models and proceeds to transform the source models into new target models. After that, the strategy uses compare and merge technologies to merge the new target models into the old target models assuming a matching strategy exist for the target domain that can relate elements from the old and new target models.

An example of a transformation using the second approach is the Java-2-UML transformation available in RSA 7.0, which uses the Fuse strategy to merge the harvested and existing UML target models. One concern in this approach is the lack of a mechanism to automatically preserve manual changes made to the target models. The used Fuse strategy detects deltas between the new and existing target models and applies them automatically if there were all safe ones (add deltas), but brings up a delta viewer UI (User Interface) in case deltas leading to data loss are detected (change and remove deltas), giving the user a chance to review and confirm them. This is inconvenient if the transform is run in batch mode, where popping up a UI is not an option, as it forces the fuse strategy to either apply all changes blindly (which could override manual changes) or fail. It is also error prone as the user may not know the scope of manual changes made to the target models and hence accidentally chose to override them. A better reapply strategy needs to be provided for model-generating transformations.

SUMMARY OF THE INVENTION

The present invention addresses the shortcoming of the prior art. In particular, the present invention provides a new multi-option reapply method and system for model-generating transformations, which perform their reapply as a post processing phase. This includes text-to-model and model-to-model transformations. The invention mechanism gives four options that can be configured in each transformation configuration. The options are:

1. Override: wipe out the contents of the existing target models and save the contents of the new target models instead.

2. Silent: use a new Fuse technology of the present invention to compare and detect deltas between the new and existing target models, ignore deltas involving portions of the target models that are marked as preservable and finally applying the remaining deltas automatically.

3. Visual: the same as the silent option in calculating the deltas to be applied. However instead of applying them automatically, it brings up a delta viewer UI (with the calculated deltas initially selected) and allows the users to review and change the deltas to be accepted/rejected.

4. Automatic: the same as silent option in calculating the deltas to be applied. However, if there exist among those deltas ones that could lead to data loss (change and remove deltas) it brings up the delta viewer UI like in the visual option; otherwise it applies automatically like in the silent option.

A mechanism for preserving manual changes in Ecore-based (Eclipse modeling framework) target models is also provided. The mechanism allows for controlling the granularity of preserving change from a feature level up to a whole hierarchy.

In a preferred embodiment, the invention method and system for model transformation reapply, comprises the steps of:

through a programming model transformation, generating a target model having one or more model elements;

marking parts of the target model as non-changeable by inserting into the generated target model respective annotations to the model elements indicating which parts are non-changeable and thus preservable; and reapplying the transformation to make changes to the target model but preserving manual changes made to the model elements based on the inserted annotations.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

In the course of applying MDA, a user might decide to do a manual change to a model that is generated from another model through a transformation. However, for that change to be preserved, the user must have a mechanism of telling the transformation to preserve this change when it is rerun. A mechanism like that, called JMerge, exists in Java Emitter Templates (JET; see www.eclipse.org/articles/Article-JET/jet_tutorial1.html) tool that is used for model-to-text transformations. Basically, JET marks various pieces of the generated java code with a '@generated' comment. The comment is emitted for the main semantics of a java class: the class itself, every attribute and every method. A user making a manual change to any of those artifacts can remove the 'generated' comment to tell JET to preserve that change.

Figure 1:
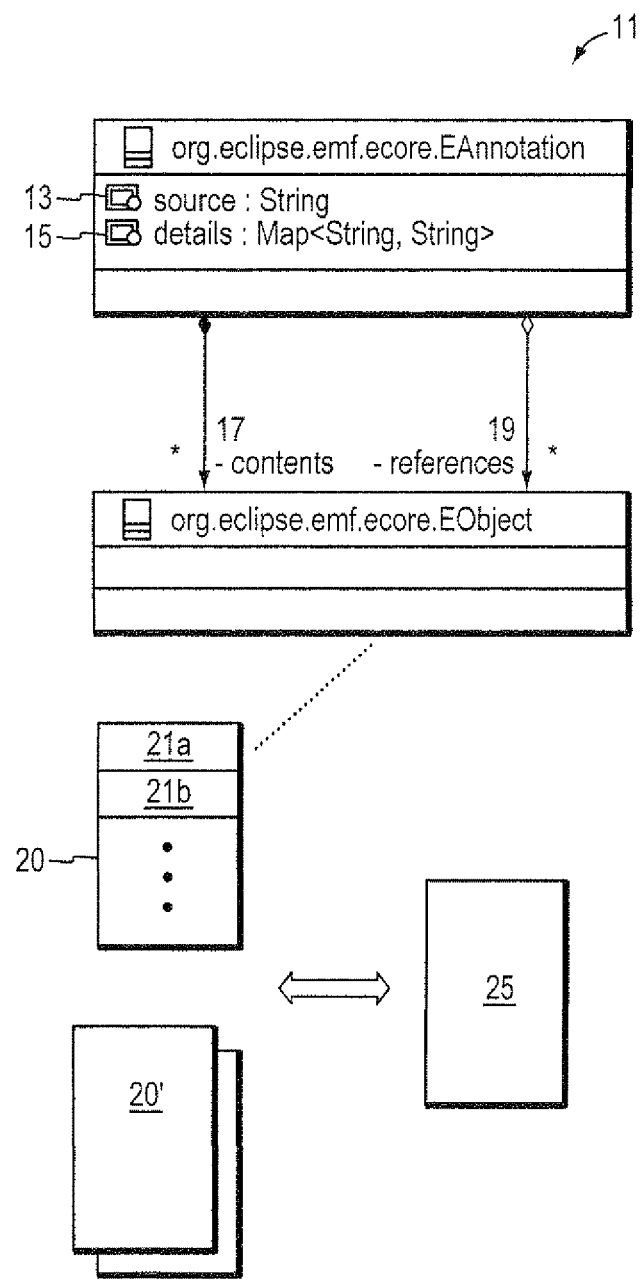
FIG. 1 is a schematic view of a preferred embodiment of the present invention.

In the present invention, a solution along the same lines of JMeger is proposed for Ecore-based models or any other program modeling domain that has an extensibility mechanism similar to EAnnotations. The main idea is to enable the user to mark parts of the model as non-changeable by the transformation through the use of a special EAnnotation 11 (FIG. 1). An Ecore meta-model (ex. UML2) whose elements derive from EModelElement give its meta-types the ability to have extra semantics added through the use of EAnnotations. The EAnnotation 11 has a 'source' 13, a string representing the type of the annotation. The EAnnotation 11 also has three mechanisms of specifying extra semantics: a string-to-string map (details) 15, a containment reference collection (contents) 17 and a non-containment reference collection (references) 19, as shown in FIG. 1.

Unlike in JET where the generator emits the 'generated' tags and the user removes them to mark the code as non-changeable (preservable), the EAnnotation 11 is not emitted by the transformation but instead inserted by the user in the model to mark the non-changeable part. The rationale here is to save on memory and footprint by not creating those EAnnotations 11 by the transformation and only incur the cost when an EAnnotation 11 is actually used for marking. The other reason is to avoid having the transformations request that elements 21 have to extend off EModelElement, and thus failing to run properly if they do not. The present invention makes the marking feature available only to elements 21 that extend off EModelElement, which is a more acceptable limitation.

The newly proposed EAnnotation 11 has the source '@preserve' and can be inserted in any target model element 21 extending off EModelElement in its eAnnotations collection. The annotation 11 can be inserted manually by the user or automatically by the modeling tool. The annotation 11 has the following semantics:

If the EAnnotation's details map 15 is empty, the EAnnotation 11 is ignored.

If the EAnnotations's details map 15 has the key '@Tree', all deltas on this element 21 and all its nested contents to any level are ignored.

If the EAnnotations's details map 15 has the key '@Element', all deltas on this element 21 are ignored.

If the EAnnotations's details map 15 has a key '<feature>', where <feature> is a name of an EStructuralFeature defined on the element 21, all deltas on this element's feature are ignored. One or more feature keys can be specified in the map.

New Transformation Fuse Method and Approach

With the present invention EAnnotation 11, a transformation 25 generating models 20 and merging them into existing models 20 can be guided to what it should override and what it should preserve. The invention new Fuse method/approach used by the transformation 25 is as follows:

1. Detect all deltas between the new target models 20' and the existing target models 20.

2. Scan the existing target models 20 for elements 21*a* with the '@preserve' EAnnotation 11.

3. Determine what deltas to ignore (not apply) based on the semantics of every EAnnotation 11, as follows:

a. If the EAnnotation's details map 15 is empty, it is ignored.

b. If the EAnnotation 11 has '@Tree' key in its details map 15, deltas on any of its containing element's 17 features along with the features of all that element's contents nested to any level are collected.

c. If the EAnnotation 11 has 'Element' key in its details map 15, deltas on any of its containing element's 17 features are collected.

d. If the EAnnotation 11 has '<feature>' keys in its details map 15, deltas on those features of its containing element 17 are collected.

4. Mark these deltas as being 'Ignored', which will force all their dependent deltas to also get ignored by the delta application engine.

5. Apply the remaining deltas to the existing models 20.

Transformation Reapply Options

Based on the invention Fuse method and approach above, a transformation 25 can have the following reapply options that can be chosen for each transformation configuration:

1. Override: do not invoke the new Fuse method above but instead override the existing target models 20 with the contents of the new target models 20'. This option can be chosen for speed if the user knows that there are no manual changes in the existing target models 20 that need to be preserved.

2. Silent: use the above Fuse method to detect deltas between the new and existing target models 20', 20 and select which of them to apply and which of them to ignore, then applying the chosen deltas automatically. This option can be chosen in batch mode and when the user is confident all manual changes to target models 20 have been properly marked.

3. Visual: the same as the silent option in calculating the deltas to be applied. However instead of applying them automatically, this option first brings up a delta viewer UI (user interface) allowing a user to inspect and change the applied/ignored deltas. The viewer is initialized with the choices made by the fuse method. This option is helpful when the user is debugging the transformation 25, when the user is still getting acquainted with the invention Fuse method/process or when the user needs to override the choices of deltas to apply/reject.

4. Automatic: the same as the silent option in calculating the deltas to be applied. However, if there exist among those deltas ones that could lead to data loss (change and remove deltas) this option brings up the delta viewer UI like in the visual option; otherwise it proceeds to apply the deltas automatically like in silent option. This option can be chosen when the user wants to review deltas that could lead to data loss but does not want to be bothered with safe deltas (add deltas).

Figure 2:
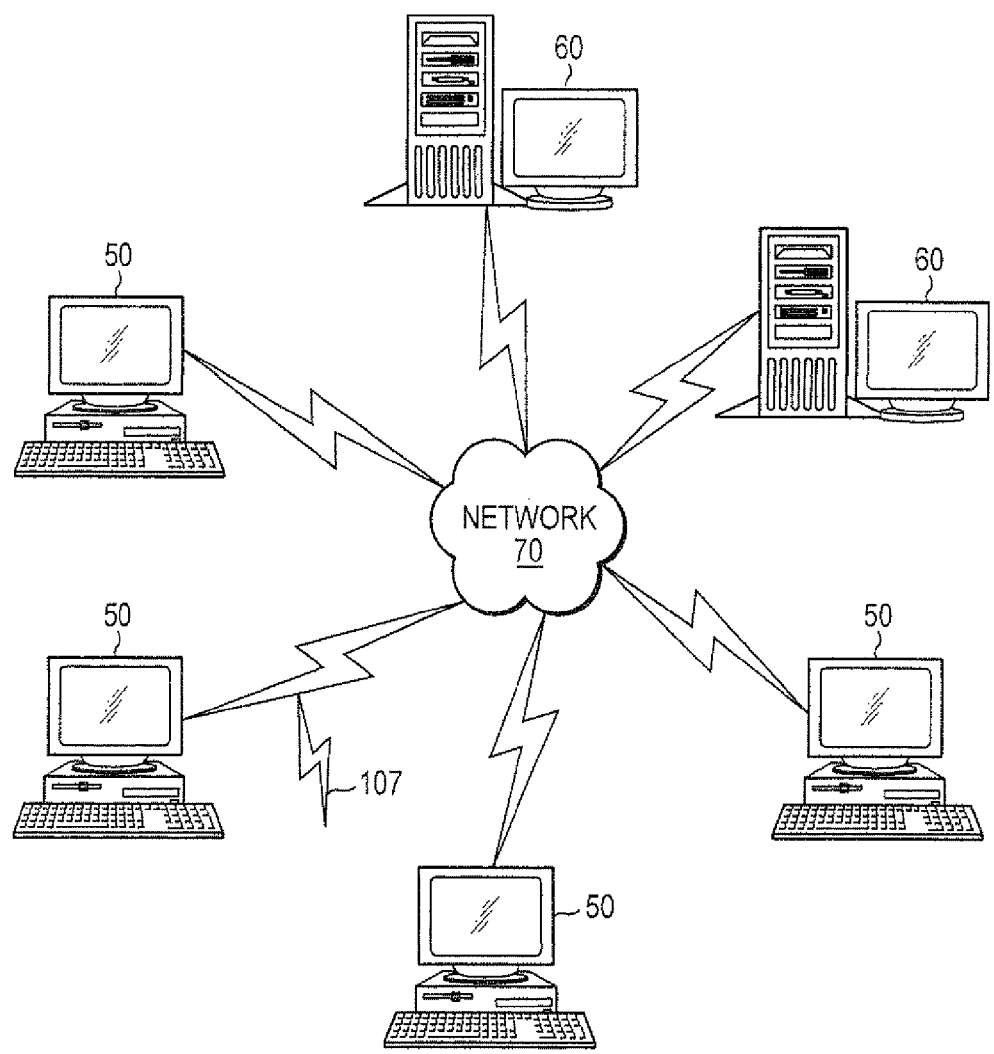
FIG. 2 is a schematic view of a computer network environment in which embodiments of the present invention are implemented.

FIG. 2 illustrates a computer network or similar digital processing environment in which the present invention may be implemented.

Client computer(s) 50 and server computer(s) 60 provide processing, storage, and input/output devices executing application programs and the like. Client computer(s) 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 3:
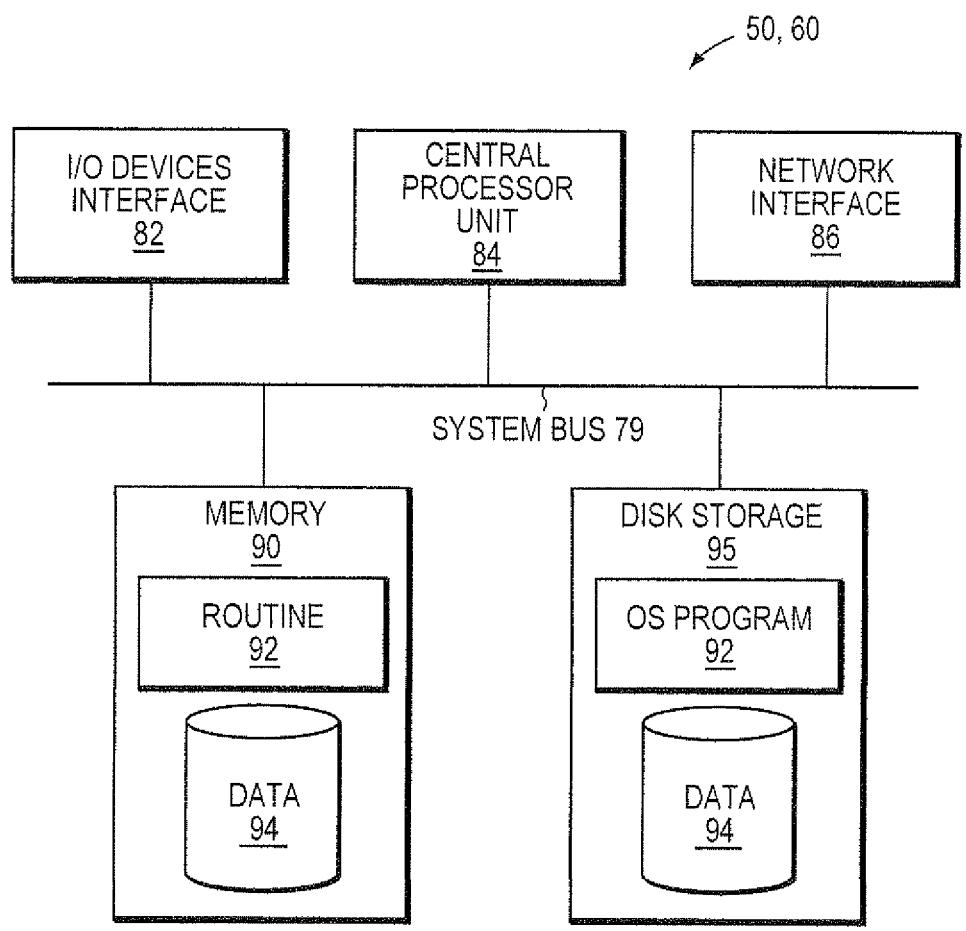
FIG. 3 is a block diagram of a computer node in the network of FIG. 2.

FIG. 3 is a diagram of the internal structure of a computer (e.g., client processor 50 or server computers 60) in the computer system of FIG. 2. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 2). Memory 90 provides volatile storage for computer software instructions 92 and data 94 used to implement an embodiment of the present invention (e.g., annotations 11, transformation reapply method/process and fuse method/process detailed above in FIG. 1). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network (s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

While this invention has been particularly shown and described with references to preferred embodiments thereof, it will be understood by those skilled in the art that various changes in form and details may be made therein without departing from the scope of the invention encompassed by the appended claims.

For example, the present invention may be implemented in a variety of computer architectures. The computer network of FIGS. 2 and 3 are for purposes of illustration and not limitation of the present invention.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

What is claimed is:

1. A computer method for model transformation reapply, comprising the processor executable steps of:

through a programming model transformation in MDA (Model Driven Architecture), generating a target model having one or more model elements, the target model being a UML-type, graphical, program modeling model that generates executable code;

marking parts of the target model as non-changeable by inserting into the generated target model respective annotations to the model elements indicating which parts are non-changeable by the programming model transformation and thus preservable, each annotation: (i) having an indication of extending the respective model element, and (ii) specifying extra semantics of extending the respective model element, for each annotation, the annotation specifying the extra semantics by any combination of: a string-to-string map, a containment reference collection and a non-containment reference collection;

reapplying the programming model transformation to make changes to the target model but preserving manual changes made to the model elements based on the extra semantics specified by the inserted annotations; and wherein reapplying the transformation further includes configuring the transformation with an option to detect deltas between newly generated target models and existing target model, and select which deltas to apply and which to ignore as a function of the inserted annotations.

2. A computer method as claimed in claim 1 wherein the inserted annotations are inserted manually by a user or automatically by a modeling tool upon manual changes being made to the respective model element.

3. A computer method as claimed in claim 1 wherein reapplying the transformation further includes configuring the transformation with art option to override existing target models with contents of newly generated target models.

4. A computer method as claimed in claim 1 wherein the option further applies the chosen deltas automatically.

5. A computer method as claimed in claim 1 wherein the option further applies the chosen deltas in accordance with user interactive command given through a user interface.

6. A computer method as claimed in claim 1 wherein the option further applies certain chosen deltas automatically and applies remaining chosen deltas in accordance with user interactive command.

7. Computer system for model transformation reapply, comprising:
a computer memory having a given programming model transformation in MDA (Model Driven Architecture);
a target model generated in memory by the given transformation, the target model being a UML-type, graphical, program modeling model that generates executable code, and the target model having one or more model elements; and
a processor providing a respective annotation for manually changed model elements indicating which parts are non-changeable by the given transformation and thus preservable, each annotation: (i) having an indication of extending the respective model element, and (ii) specifying extra semantics of extending the respective model element, for each annotation, the annotation specifying the extra semantics by any combination of: a string-to-string map, a containment reference collection and a non-containment reference collection; each annotation being inserted into the generated target model in a manner such that upon reapply of the given transformation, changes are made to the target model but manual changes to the model elements are preserved based on the extra semantics specified by the inserted annotations; and
wherein reapplying the transformation further includes configuring the transformation with an option to detect deltas between newly generated target models and existing target model, and select which deltas to apply and which to ignore as a function of the inserted annotations.

8. A computer system as claimed in claim 7 wherein the inserted annotations are inserted manually by a user or automatically by a modeling tool upon manual changes being made to the respective model element.

9. A computer system as claimed in claim 7 wherein reapplying the given transformation further includes configuring the transformation with an option to override existing target models with contents of newly generated target models.

10. A computer system as claimed in claim 7 wherein the option further applies the chosen deltas automatically.

11. A computer system as claimed in claim 7 wherein the option further applies the chosen deltas in accordance with user interactive command given through a user interface.

12. A computer system as claimed in claim 7 wherein the option further applies certain chosen deltas automatically and applies remaining chosen deltas in accordance with user interactive command.

13. Computer apparatus for model transformation reapply, comprising:
programming model transformation means for generating, from a model transformation in MDA (Model Driven Architecture), a target model in a program modeling domain having an extension means, the target model being a UML-type, graphical, program modeling model that generates executable code, and the target model having one or more model elements;
preservation means for marking parts of model elements of the generated target model as non-changeable by the model transformation, each annotation: (i) having an indication of extending the respective model element, and (ii) specifying extra semantics of extending the respective model element, for each annotation, the annotation specifying the extra semantics by any combination of: a string-to-string map, a containment reference collection and a non-containment reference collection, said marking using the extension means such that upon reapply of the model transformation, changes are made to the target model but manual changes to the model elements are preserved based on the specified extra semantics; and
model generation means for generating transformation code implementation of the target model with manual changes preserved; and
wherein reapplying the transformation further includes configuring the transformation with an option to detect deltas between newly generated target models and existing target model, and select which deltas to apply and which to ignore as a function of the inserted annotations.

14. Computer apparatus as claimed in claim 13 wherein the extension means is annotations for respective model elements.

15. A computer program product comprising:
a non-transient computer readable storage medium having a computer readable program, wherein the computer readable program when executed by a computer causes:
through a programming model transformation in MDA (Model Driven Architecture), generating a target model having one or more model elements, the target model being a UML-type, graphical, program modeling model that generates executable code;
marking parts of the target model as non-changeable by inserting into the generated target model respective annotations to the model elements indicating which parts are non-changeable by the programming model transformation and thus preservable, each annotation: (i) having an indication of extending the respective model element, and (ii) specifying extra semantics of extending the respective model element, for each annotation, the annotation specifying the extra semantics by any combination of: a string-to-string map, a containment reference collection and a non-containment reference collection; and
reapplying the programming model transformation to make changes to the target model but preserving manual changes made to the model elements based on the specified extra semantics of the inserted annotations; and
wherein reapplying the transformation further includes configuring the transformation with an option to detect deltas between newly generated target models and existing target model, and select which deltas to apply and which to ignore as a function of the inserted annotations.

\* \* \* \* \*